UNITED STATES PATENT OFFICE.

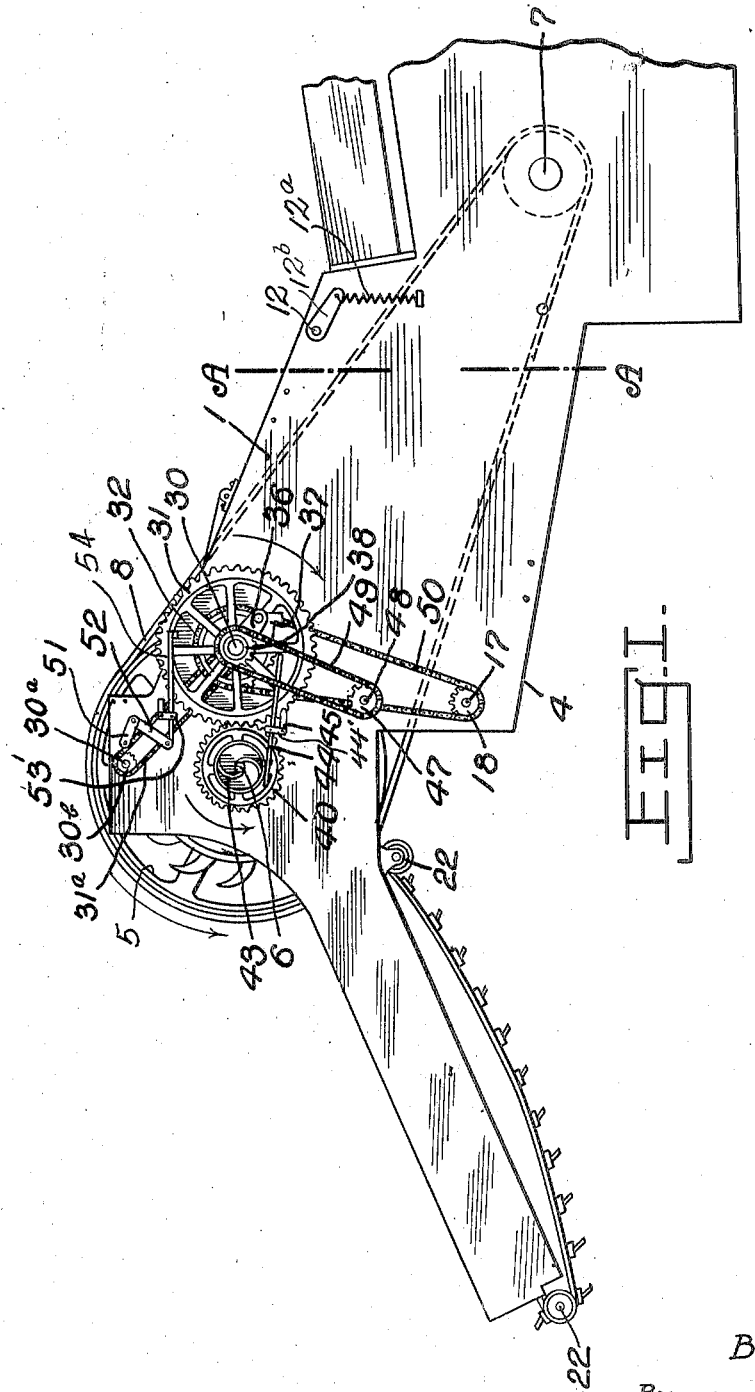

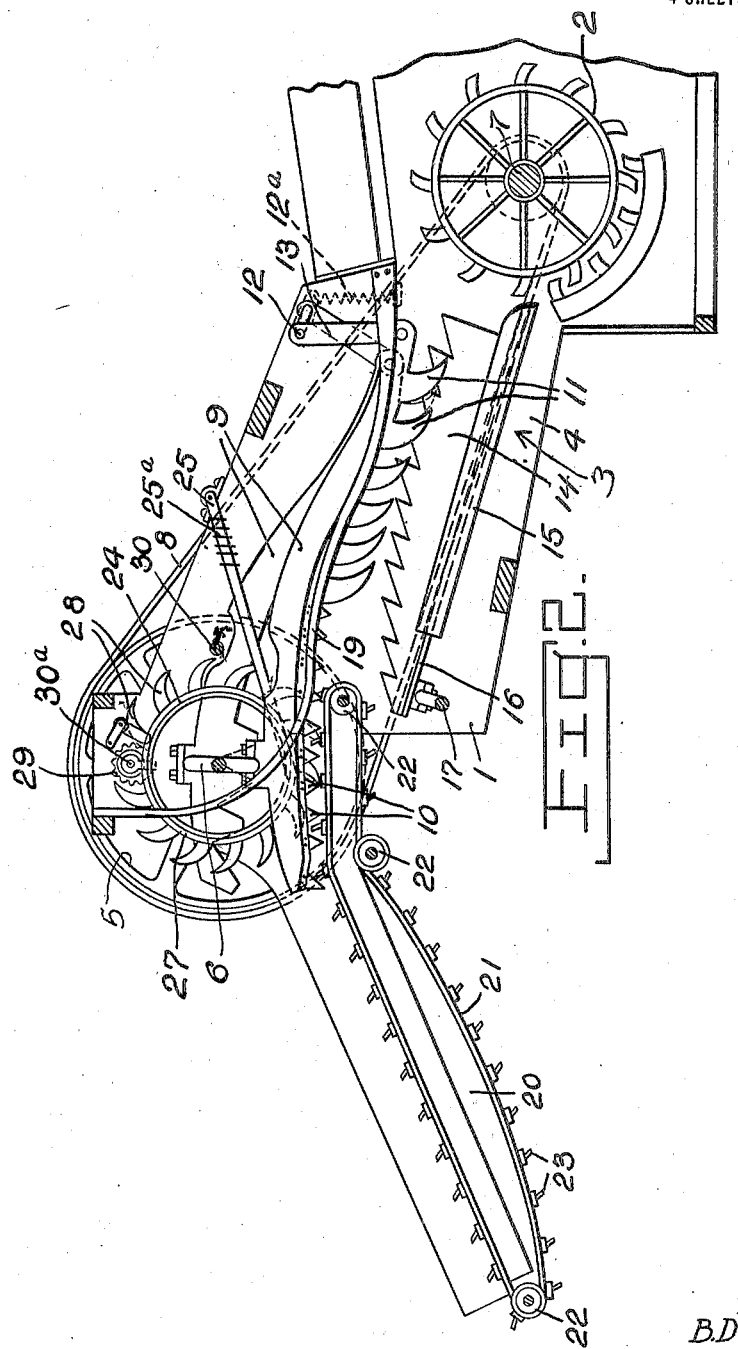

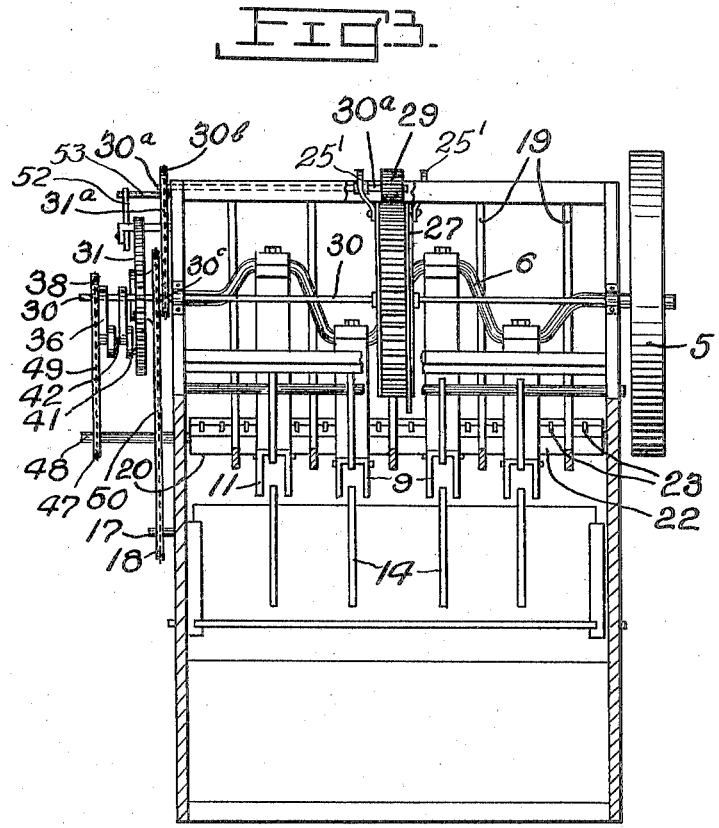
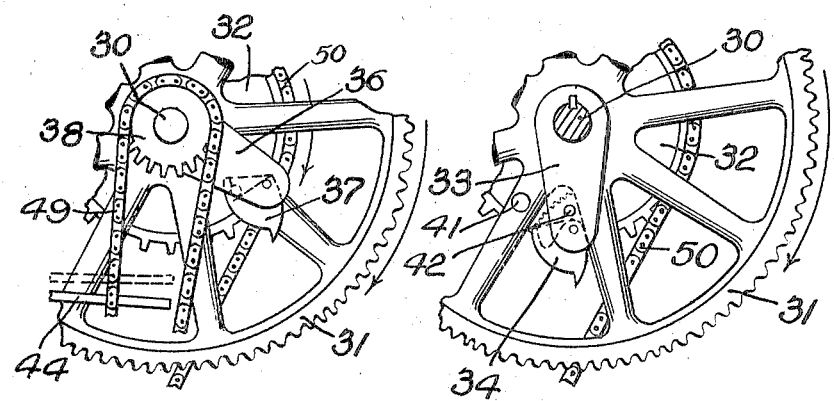

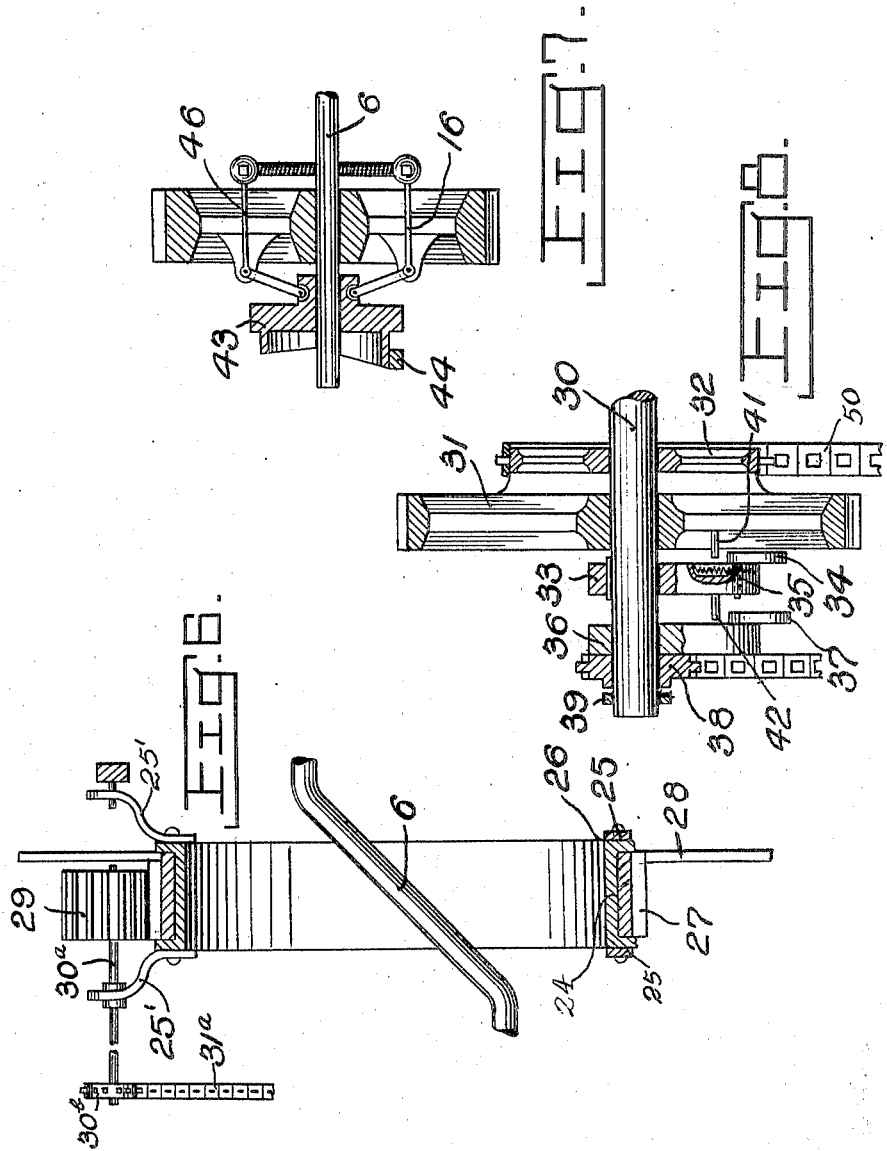

BRUNO DION AND AMÉDÉE DION, OF STE. THERESE DE BLAINVILLE, QUEBEC, CANADA.

BAND-CUTTER AND FEEDER.

1,345,588.  Specification of Letters Patent.  Patented July 6, 1920.

Application filed July 26, 1918. Serial No. 246,866.

*To all whom it may concern:*

Be it known that we, BRUNO DION and AMÉDÉE DION, residing at Ste. Therese de Blainville, Quebec, Canada, have invented certain new and useful Improvements in Band-Cutters and Feeders; and we do hereby declare that the following is a full, clear, and exact description of the same.

The present invention relates to band cutters and feeders for threshing machines and the main object is to provide improved mechanism for feeding grain evenly to the thresher, and for cutting the bands and spreading the grain before it reaches the cylinder.

A further object is to provide a machine of this character having improved means whereby when one or more bundles are introduced crosswise thereinto, the increased thickness or height of such bundle or bundles will cause the carrier to be automatically stopped in order to give the feeder bars time to spread the bundles.

Another object of the invention is to provide one or more improved rotatable and bodily movable retarders placed at the front of the feeding bars so that the bundle fed crosswise on the carrier will be automatically stopped and spread by the cutting knives on the feeder bars together with the cutter blades on the retarder.

Another object of the present invention is to provide improved means whereby the carrier and the movable rotary retarder will be stopped simultaneously and automatically by centrifugal action when too much grain reaches the cylinder or the driving power used may change speed, in order to eliminate the choking of the cylinder.

A further improvement comprised in the invention consists in hinging the cutting bars at their outer ends adjacent the cylinder in such a way that they rise and fall according to the quantities of grain, an even tension being kept on the grain by means of a spring or a weight in order to evenly feed the grain to the cylinder.

The invention will be better understood with the aid of the accompanying drawings in which:

Figure 1 is a longitudinal side elevation of the machine.

Fig. 2 is a longitudinal section of the machine.

Fig. 3 is a cross section of the machine on line A—A of Fig. 1.

Fig. 4 is an enlarged side elevation of a portion of the transmission gear and its stopping means.

Fig. 5 is an enlarged side elevation of a portion of the transmission gear, the driving gear of the carrier having been removed.

Fig. 6 is a cross section through the retarder device.

Fig. 7 is a cross section through the gear mounted on the crank shaft and the centrifugal governor.

Fig. 8 is a cross section through the driving gear and stopping attachment mounted on the driving shaft of the retarder.

Like numerals of reference indicate corresponding parts in each figure.

In the drawings, 1 indicates the feeder frame, 2 is the cylinder which separates the grain from the straw and 3 is a feeder table or shoe. The frame 1 is constructed of side plates 4 which are connected by suitable cross bars so as to form an open frame.

5 is a pulley mounted on one end of the multiple crank shaft 6 which is journaled in the side plates 4 of the frame. The said pulley 5 may be connected by means of the belt 8 to any source of power, preferably to the main drive shaft 7 on which the cylinder 2 is mounted.

9 are longitudinal feeding bars of U-section, the members of which are provided at their forward ends with a plurality of depending cutting teeth 10, and at their rear ends with a plurality of curved teeth 11, said feeding bars being reciprocated simultaneously during their operation of feeding the grain to the cylinder by the multiple crank shaft 6, and being connected at their rear ends by links 13 to a transversely arranged crank shaft 12 journaled in the frame. The links 13 are secured to shaft 12, and the latter also has secured to it, exteriorly of the frame, a crank arm $12^b$ to which is connected the upper end of a retractile coil spring $12^a$, anchored at its lower end to the frame, the arrangement being such that the downward pressure thus exerted upon said arm $12^b$ is transmitted to the links 13, with the result that the rear ends of the feeding bars are pressed down against the grain.

The above-mentioned feed table 3 consists of a frame 15 which is pivotally connected to the frame 1, said frame 15 having formed therein a channel which is adapted to receive a sliding extension table 16 which is reciprocated toward and from the threshing cylinder by the crank shaft 17 journaled in said frame 1. Said crank shaft 17 is preferably actuated by means of a gear 18. The sliding extension table 16 is provided with vertical toothed sections 14 adapted to catch the bundles and carry them to the forward part of the feeder, said toothed sections being arranged to operate between the curved teeth 11.

19 are guide rods that serve to direct the bundles to the cylinder and to keep them in position to be spread out and cut by the coacting toothed parts 11 and 14 during their travel to the cylinder; 20 is a carrier of any suitable form consisting of a belt 21 passing over rollers 22, and 23 are lugs on the carrier adapted to engage the bundles and carry them to the feeder.

Mounted in encircling relation to the crank shaft 6 is a circular member or drum 24 movably supported by upper and lower pairs of pivotally connected links 25′ and 25, the two lower links 25 being secured to the frame and provided, each, with a spiral spring 25ª which is adapted to hold the same in position. One of the two upper links 25′ is likewise pivoted to the frame, while the other is pivotally connected to a short cross-shaft 30ª, which is journaled in and supported by the adjacent side plate 4 adjacent its outer end and is supported at its inner end by the aforesaid link 25′ and the drum. The drum 24 is formed with a circumferential U-shaped groove 26; and 27 is a gear loosely mounted in said groove 26 and provided on one side thereof with curved cutting blades 28, which act to sever the bands on the bundles during the passage of the latter beneath the same, and to coöperate with the teeth 10 in cutting the bundles before they reach the feeding table 3. 29 is a pinion engaging and driving said gear 27 and mounted on the transverse shaft 30ª. On the opposite side of said frame 1 from the pulley 5, and loosely mounted on a shaft 30 journaled in the plates 4 is a large transmission gear 31 having secured thereto a sprocket gear 32 of smaller diameter; and 33 is an arm or pawl carrier keyed to said shaft 30 and having a pawl 34 pivotally secured to it and held in operative position by the spiral spring 35.

Adjacent said pawl carrier 33, is a similar carrier 36, which is loosely mounted on said shaft 30 and is provided with a pawl 37 pivotally secured to it and held in position by a spiral spring. Secured to said pawl carrier 36 is a sprocket gear 38 also mounted loosely on said shaft 30, and 39 is a collar secured on said shaft to hold said gear in position.

The gear 31 meshes with and is driven by the gear 40 (Fig. 1), which is mounted on the crank shaft 6, and is provided with a pin 41 (Fig. 8) which is adapted to engage the pawl 34 on the carrier 33, said pawl carrier 33 being provided in turn with a pin 42 to engage the pawl 37. In this way, the rotation of gear 31 is transmitted by means of its pin 41 to the carrier 33, and from the latter to carrier 36 and gear 38, consequent upon the engagement of the pin 42 and pawl 37, the rigid connection of carrier 33 to shaft 30 serving to rotate said shaft, as will be understood.

On the outer end of the shaft 30ª is mounted a sprocket gear 30ᵇ, and 30ᶜ is a sprocket gear mounted on the shaft 30. Gears 30ᵇ and 30ᶜ are connected by a sprocket chain 31ª which transmits motion from shaft 30 to shaft 30ª, the rotation of the latter being transmitted, in turn, through pinion 29 to the drum pinion 27, as already explained.

43 is a disk which is slidably and rotatably mounted on the crank shaft 6 as indicated in Fig. 7, and which is provided on one face with a laterally projecting, spiral cam rib or shoulder adapted to engage the adjacent end of a rod 44 provided intermediate its ends with a lateral arm 44′, the other end of the rod extending adjacent the pawl 34. The said arm 44′ is pivoted to a bracket 45 fixed to the frame side 4 so as to permit a rocking or swinging movement of the rod about said bracket as a fulcrum, and the rod 44 in its normal position is disposed inwardly of, and hence does not engage, the spiral cam 43. When the speed is reduced, however, the centrifugal governor 46 carried by the gear 40 and connected to the disk 43 will force said disk away from gear 40, thereby bringing the cam on said disk into a position in which it lies in the vertical plane of the rod, so that it is enabled to engage and depress the rod end.

The rod 44 will be tilted in a counter-clockwise direction by its engagement with said cam, and its free rear end raised slightly, as indicated in dotted lines in Fig. 4, in which position its said end will engage pawl 34 and release it from pin 41, with the result that the rotation of carriers 33 and 36 and shaft 30 will cease.

47 (Fig. 1) is a gear mounted on a transverse shaft 48, on which is also mounted one of the driving rollers 22 of the carrier 20; and 49 is a sprocket chain connecting said gears 47 and 38 and driving the former from the latter, from which it follows that the carrier 20 and the retarder drum 24 are actuated simultaneously. The gear 18, which is mounted on the crank shaft 17, is connected with and driven from the gear 32 by a sprocket chain 50, whereby the feed table 3 and the feeding bars 9 are actuated simultaneously.

A link 51 is pivoted at its upper end to the frame and at its lower end to a second link 52. The latter is secured in some suitable manner to the retarder drum 24 and is also connected to a stop rod 54 which is provided with an intermediate, lateral arm 53' which is fulcrumed at its free end on a bracket 53 on the frame in much the same manner as the rod 44. When the drum 24 is raised by the passage of a bundle crosswise beneath it, the upward movement of said drum will lift up the pivoted end of the rod 54 and depress its free end, thereby bringing the latter end into position to engage the pawl 37 on the carrier 36 and release it from pin 42, with the result that the carrier 36 and the gear 38 connected to it cease to be driven by the carrier 33. Consequently, when such engagement of the parts 54 and 37 takes place, the retarder 24 and the carrier belt 20 will be automatically stopped.

What I claim as my invention is:

1. In a machine of the character specified, the combination of a rotary shaft; a drum encircling said shaft but free from contact therewith or support thereon, said drum being provided with cutting means; driving connections between said shaft and said drum for rotating the latter from the former; a carrier for delivering bundles beneath said drum to be acted upon by said cutting means; driving connections between said carrier and said shaft; a centrifugal governor carried by said shaft; and mechanism controlled automatically by said governor for interrupting both driving connections.

2. In a machine of the character specified, the combination of a rotary shaft; a drum encircling said shaft but free from contact therewith or support thereon, said drum being provided with cutting means; driving connections between said shaft and said drum for rotating the latter from the former; a carrier for delivering bundles beneath said drum to be acted upon by said cutting means; driving connections between said carrier and said shaft; a centrifugal governor carried by said shaft; and means under the joint control of said shaft and said governor for automatically interrupting both driving connections simultaneously.

3. In a machine of the character specified, the combination of a rotary shaft; a drum encircling said shaft but free from contact therewith or support thereon, said drum being provided with cutting means; driving connections between said shaft and said drum for rotating the latter from the former; a carrier for delivering bundles beneath said drum to be acted upon by said cutting means; driving connections between said carrier and said shaft; a centrifugal governor carried by said shaft; a rod located adjacent to one of said driving connections for interrupting the same; and a controller on said shaft adapted to act upon said rod and to be shifted by said governor into position to act upon said rod.

4. In a machine of the character specified, the combination of a rotary shaft; a drum encircling said shaft but free from contact therewith or support thereon, said drum being provided with cutting means; driving connections between said shaft and said drum for rotating the latter from the former; a carrier for delivering bundles beneath said drum to be acted upon by said cutting means; driving connections between said carrier and said shaft; a centrifugal governor carried by said shaft; a rod located adjacent to one of said driving connections for interrupting the same; and a cam on said shaft adapted to move said rod into operative position and to be shifted by said governor into position to engage said rod.

5. In a machine of the character specified, the combination of a rotary shaft; a drum encircling said shaft but free from contact therewith or support thereon, said drum being provided with cutting means; a carrier for delivering bundles beneath said drum to be acted upon by said cutting means; mechanism driven by said shaft and including a train of pawls, for operating said carrier and said drum; a rod located adjacent the pawl train for interrupting the same; and means driven by said shaft for automatically controlling the operation of said rod.

6. In a machine of the character specified, the combination of a rotary shaft; a drum encircling said shaft but free from contact therewith or support thereon, said drum being provided with cutting means; a carrier for delivering bundles beneath said drum to be acted upon by said cutting means; mechanism driven by said shaft and including a train of pawls, for operating said carrier and said drum; a rod located adjacent the pawl train for interrupting the same; a disk slidably mounted on said shaft and adapted to engage said rod and move it into effective position; and means operated by said shaft for automatically shifting said disk into position for such engagement.

7. In a machine of the character specified, the combination of a rotary shaft; a drum encircling said shaft but free from contact therewith or support thereon, said drum being provided with cutting means; a carrier for delivering bundles beneath said drum to be acted upon by said cutting means; mechanism driven by said shaft and including a train of pawls, for operating said carrier and said drum; a rod located adjacent the pawl train for interrupting the same; a disk slidably mounted on said shaft and provided with a spiral cam adapted to engage said rod and rock it into effective position; and means operated by said shaft for automatically shifting said disk, to bring its cam into position for such engagement.

8. In a machine of the character specified, the combination of a rotary shaft; a drum encircling said shaft but free from contact therewith or support thereon, said drum being provided with cutting means; a carrier for delivering bundles beneath said drum to be acted upon by said cutting means; mechanism driven by said shaft and including a train of pawls, for operating said carrier and said drum; a rod located adjacent the pawl train for interrupting the same; a disk slidably mounted on said shaft and adapted to engage said rod and move it into effective position; and a centrifugal governor mounted on said shaft and connected with said disk to automatically shift the latter into position for such engagement.

9. In a machine of the character specified, the combination of a driving shaft; a rising-and-falling retarder drum encircling said shaft but not supported thereon, said drum being provided with cutting means; a carrier for delivering bundles endwise beneath said drum to be acted on by said cutting means; connections between said shaft and said carrier and drum for driving said carrier and rotating said drum; and mechanism operated automatically when said drum is forced upward by the passage of a bundle crosswise beneath it for interrupting said driving connections.

10. In a machine of the character specified, the combination of a driving shaft; a rising-and-falling retarder drum encircling said shaft but not supported thereon, said drum being provided with cutting means; a carrier for delivering bundles endwise beneath said drum to be acted on by said cutting means; connections between said shaft and said carrier and drum for driving said carrier and rotating said drum; and separate mechanisms operated, one by the upward movement of the drum and the other by a change in the speed of said shaft, for interrupting said driving connections.

11. In a machine of the character specified, the combination of a driving shaft; a rising-and-falling retarder drum encircling said shaft but not supported thereon, said drum being provided with cutting means; a carrier for delivering bundles endwise beneath said drum to be acted on by said cutting means; driving connections between said shaft and said carrier and drum and including a train of pawls; and a rod located adjacent the pawl train for interrupting the same and moved automatically into position for such interrupting action consequent upon the upward movement of the drum.

12. In a machine of the character specified, the combination of a driving shaft, a rising-and-falling retarder drum encircling said shaft but not supported thereon, said drum being provided with cutting means; a carrier for delivering bundles endwise beneath said drum to be acted on by said cutting means; driving connections between said shaft and said carrier and drum and including a pair of pawls; a pair of rods located adjacent said pawls in position to engage the same so as to interrupt the driving connections; means associated with one of said rods for automatically moving it into effective position when a change in the speed of rotation of the drum takes place; and means associated with the other rod for automatically moving it into effective position consequent upon the upward movement of the drum.

13. In a machine of the character specified, the combination of a rotatable crank shaft; a retarder drum encircling said shaft but not supported thereon, said drum being provided with band cutters; a belt carrier below said drum; and reciprocating feeding bars mounted on said crank shaft on opposite sides of said drum.

Signed at Montreal, Quebec, Canada, this 11th day of April, 1918.

BRUNO DION.
AMÉDÉE DION.

Witnesses:
PALMIRE DUBOIS,
EMILIENNE LEBEL.